(12) United States Patent
Deeb et al.

(10) Patent No.: US 6,436,529 B1
(45) Date of Patent: Aug. 20, 2002

(54) ELATOMERIC LAMINATES AND COMPOSITES

(75) Inventors: Gerald Steven Deeb, Mendota Heights, MN (US); Dennis Louis Krueger, Hudson, WI (US); Jane K. Peterson, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/896,971

(22) Filed: Jul. 18, 1997

Related U.S. Application Data

(63) Continuation-in-part of application No. 08/785,117, filed on Jan. 21, 1997, now abandoned.

(51) Int. Cl.$^7$ ................................................. B32B 5/14
(52) U.S. Cl. ........................ 428/354; 428/152; 428/343; 428/492; 428/494; 428/910; 2/200.2; 2/452
(58) Field of Search ........................... 428/343, 492, 428/494, 152, 910; 2/200.2, 452

(56) References Cited

U.S. PATENT DOCUMENTS

| | | | |
|---|---|---|---|
| 3,424,649 A | 1/1969 | Nyberg et al. | 428/517 |
| 3,694,815 A | 10/1972 | Burger | 2/900 |
| 3,819,401 A | 6/1974 | Massengale et al. | 156/85 |
| 3,912,565 A | 10/1975 | Koc et al. | 156/85 |
| RE28,688 E | 1/1976 | Cook | 523/300 |
| 4,082,877 A | 4/1978 | Shadle | 428/220 |
| 4,143,195 A | 3/1979 | Rasmussen | 428/116 |
| 4,181,752 A | 1/1980 | Martens et al. | 427/516 |
| 4,303,571 A | 12/1981 | Jansen et al. | 524/426 |
| 4,337,771 A | 7/1982 | Pieniak et al. | 604/370 |
| 4,476,180 A | 10/1984 | Wnuk | 428/220 |
| 4,515,595 A | 5/1985 | Kievit et al. | 604/385.2 |
| 4,524,099 A | 6/1985 | Luccio | 428/213 |
| 4,552,795 A | 11/1985 | Hansen et al. | 428/110 |
| 4,563,185 A | 1/1986 | Reiter | 604/385.2 |
| 4,681,580 A | 7/1987 | Reising et al. | 604/385.2 |
| 4,710,189 A | 12/1987 | Lash | 604/385.2 |
| 4,795,456 A | 1/1989 | Borgers et al. | 604/390 |
| 4,813,946 A | 3/1989 | Sabee | 604/385.2 |
| 4,820,590 A | 4/1989 | Hodgson, Jr. et al. | 428/516 |
| 4,834,741 A | 5/1989 | Sabee | 604/385.2 |
| 4,857,409 A | 8/1989 | Hazelton et al. | 428/494 |
| 4,880,682 A | 11/1989 | Hazelton et al. | 428/152 |
| 5,156,789 A | 10/1992 | Amaral et al. | 264/160 |
| 5,447,976 A * | 9/1995 | Curton et al. | 523/438 |
| 5,501,679 A * | 3/1996 | Krueger et al. | 604/393 |
| 5,724,677 A | 3/1998 | Bryant et al. | 2/206 |
| 6,187,425 B1 * | 2/2001 | Bell et al. | 428/221 |

FOREIGN PATENT DOCUMENTS

| | | |
|---|---|---|
| EP | 119827 | 9/1984 |
| EP | 0 419 742 A1 | 4/1991 |
| EP | 0 634 453 B1 | 10/1999 |
| GB | 1264196 | 2/1972 |
| GB | 2160473 | 5/1984 |
| GB | 2173688 | 10/1986 |
| GB | 2190406 | 11/1987 |
| JP | 63-108053 | * 5/1988 |
| JP | 09 156048 | * 6/1997 |
| WO | WO 98/31743 | 7/1998 |

OTHER PUBLICATIONS

Company Literature: Fact Sheet from Arizona Chemical re XR–6503, undated.
Article: Himes et al., "Achieving High Service Temperatures With Thermoplastic Elastomers," 1996 Hot Melt Symposium.

* cited by examiner

*Primary Examiner*—Terrel Morris
*Assistant Examiner*—John J. Guarriello
(74) *Attorney, Agent, or Firm*—Karl G. Hanson; James A. Rogers; David R. Cleveland

(57) ABSTRACT

Microtextured elastomeric materials having at least one elastomeric core layer or region and at least one skin layer wherein the skin layer has a semi-crystalline or amorphous polymer and an elastomeric block copolymer or pressure sensitive adhesive, the combination of which is less elastic than the core layer and will undergo permanent deformation at the stretch percentage that the elastomeric laminate will undergo. The materials are suited for use in applications such as respirators.

2 Claims, 3 Drawing Sheets

ELATOMERIC LAMINATES AND COMPOSITES

This application is a continuation-in-part of U.S. application Ser. No. 08/785,117, filed Jan. 21, 1997, now abandoned.

TECHNICAL FIELD

This invention relates to elastomeric materials and specifically to elastomeric laminates and composites. These materials are particularly useful in applications such as headbands for respirators and masks.

BACKGROUND

Elastomeric materials are widely used in applications such as baby diapers and adult incontinence devices. These materials are typically used in the body hugging portions of the garments. For example, U.S. Pat. No. 4,681,580 to Reising et al. and U.S. Pat. No. 4,710,189 to Lash describe the use of such material in diapers. Materials of this nature are described in more detail in U.S. Pat. No. 3,819,401 to Massengale et al., U.S. Pat. No. 3,912,565 to Koch et al., U.S. Pat. No. RE 28,688 to Cook, and U.S. Pat. No. 4,820,590 to Hodgson et al.

A difficulty in using elastomers for other applications, such as headbands, is that they typically exhibit relatively inflexible stress/strain characteristics. Materials with a high modulus of elasticity are uncomfortable for the wearer. Problems with a relatively stiff or high modulus of elasticity material can be exaggerated by the coefficient of friction and necking of the elastomer which can cause the material to bite or grab the wearer.

In mask and respirator applications, the comfort of the wearer is important. The masks and respirators may be worn for long periods of time. Accordingly, the headbands should be smooth and soft. However, in order to facilitate a good seal between the mask or respirator and the wearer's head, the surface of the headband should not be slippery. Headbands can slip because of the weight of the respirator or mask and the force exerted by the stretched headband when it is placed over the head of the wearer.

SUMMARY OF THE INVENTION

Oil and heat pose another problem with respect to headband applications. Humans excrete oil from skin. The headband comes into contact with this oil along the wearer's face and hair. Oil, in combination with heat, may cause the degradation of many materials that would otherwise be suitable for use in headbands.

Accordingly, there is a need for elastomeric laminates and composites that provide a soft and smooth feel yet exhibit non-slip characteristics.

In addition, there is a need for oil resistant elastomeric laminates and composites that are suitable for use in headbands.

The present invention relates to composite and laminate materials that are soft and smooth to the touch yet exhibit non-slip characteristics. The materials have at least one discrete elastomeric core material, in the form of a layer or region, and at least one skin layer. The core comprises a thermoplastic and extrudable polymer such as a "KRATON" polymer sold by Shell Chemical Company of Beaupre, Ohio. This core provides elastomeric properties to the material.

The polymeric skin layer comprises a semi-crystalline or amorphous polymer and an elastomeric block copolymer or pressure sensitive adhesive, the combination of which is less elastic than the core layer(s) and will undergo permanent deformation at the stretch percentage that the elastomeric laminate will undergo. The friction force of this skin against a surface may be altered by adjusting the blend of polymer and block copolymer or pressure sensitive adhesive. The polymeric skin layer(s) is also capable of becoming microtextured such that the surface comprises peak and valley irregularities or folds that are large enough to be perceived by the unaided human eye but are small enough to be perceived as smooth or soft to the touch. This layer can function to permit controlled release or recovery of the stretched elastomer, modify the modulus of elasticity of the elastomeric material, and/or stabilize the shape of the material.

Increased oil resistance may be achieved in the present invention with the addition of an oil resistance agent into the core layer. In a preferred embodiment, the oil resistance agent is poly(phenylene oxide). Other oil resistance additives may added to increase oil resistance.

The material of the present invention is well suited to applications where comfort is enhanced by a smooth and soft touch and safety may be enhanced by a non-slip surface. Such applications include headbands for respiratory devices such as respirators, surgical masks, clean room masks, face shields, dust masks and a variety of other face coverings.

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

The present invention relates broadly to novel, multi-layer elastomeric materials having at least one elastomeric core material and one skin layer. The skin layer is stretched beyond its elastic limit and is relaxed with the core so as to form a microtextured surface. More particularly, this invention relates to an improvement to the tack of this material such that it has a non-slip surface. The term "non-slip", for purposes of this invention, means that the material exhibits a friction force equal to or greater than 0.15 lbs. as determined by the friction test set forth below. The combination of a core and a skin layer to form a microtextured elastomeric material, as well as the method of making the same, is generally described in U.S. Pat. Nos. 5,501,679 and 5,429,856 to Krueger et al., the substance of which is incorporated herein by reference.

Figure 1:
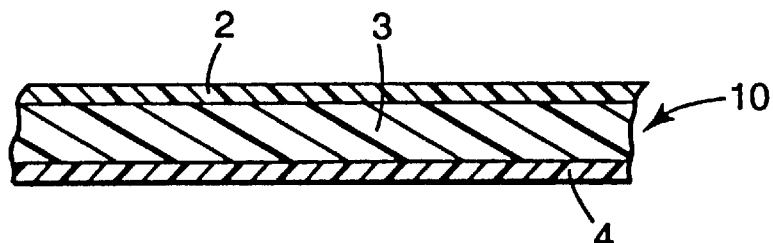
FIG. 1 is a cross-sectional segment of an extruded laminate of the invention before microtexturing.
Figure 2:
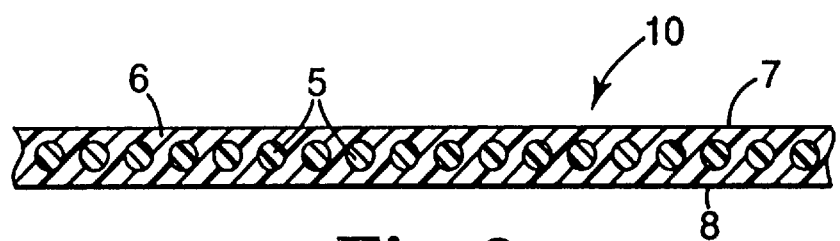
FIG. 2 is a cross-sectional segment of a composite of the present invention.

Briefly, FIG. 1 shows a cross-section of a laminate 10 of the present invention in its relaxed form. The elastomeric core layer 3 is bordered by skin layers 2, 4. The skin layers 2, 4 may be in continuous contact with the core 3 or discontinuous contact with the core 3. This laminate is capable of becoming microtextured. With reference to FIG. 2, the present invention includes a composite 10 containing a core region 5 with a polymeric matrix 6 having skin layers 7, 8 that are capable of becoming microtextured at specific areas.

Figure 3:
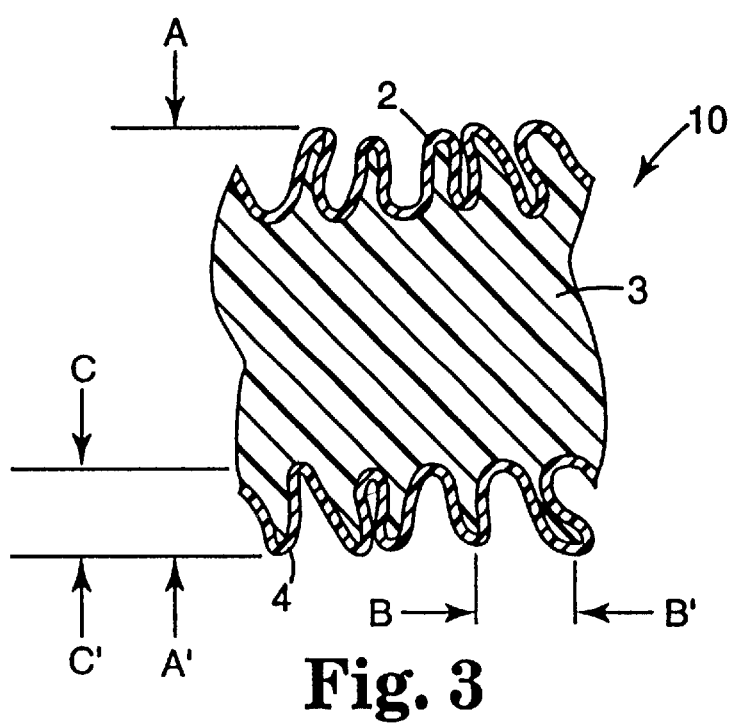
FIG. 3 is a cross-sectional segment of FIG. 1 of the laminate with microtexturing caused by uniaxially stretching a film of the invention.

FIG. 3 shows a cross section of the laminate 10 of FIG. 1 in its microtextured form. The general texture is a series of regular repeating folds. These variables are the total height A–A', the peak-to-peak distance B–B', and the peak-to-valley distance C–C'.

The elastomeric core layer or region may include any material which is capable of being formed into a thin film layer or strands and exhibits elastomeric properties at ambient conditions. Elastomeric means that the material will substantially resume its original shape after being stretched. Preferably, the elastomer will sustain only small permanent set following deformation and relaxation which set is preferably less than 20% and more preferably less than 10% of the original length at moderate elongation, e.g., about 400–500%. Generally, any elastomer is acceptable which is capable of being stretched to a degree that causes relatively consistent permanent deformation in a relatively inelastic skin layer. This can be as low as 50% elongation. Preferably, the elastomer is capable of undergoing up to 300 to 1200% elongation at room temperature. The elastomer can be both pure elastomers and blends with an elastomeric phase or content that will still exhibit substantial elastomeric properties at room temperature.

Heat-shrinkable elastomers are suitable for use in the present invention because of the ability to fabricate at ambient conditions using the heat unstable stretched elastomer and subsequently applying heat to shirr the product. Other non-heat shrinkable elastomers can be used while retaining the advantages of heat shrinkability with the added dimension of the possibility of substantially controlling the heat shrink process. Non-heat shrinkable means that the elastomer, when stretched, will substantially recover, sustaining only a small permanent set.

Suitable elastomers include such non-heat-shrinkable elastomeric polymers known to those skilled in the art as A–B and A–B–A block copolymers. Star or radial block copolymers may also be suitable in the present invention. Elastomeric block copolymers are typically thermoplastic rubbers that have a rubbery midblock with at least two plastic endblocks. Block copolymers are described, for example, in U.S. Pat. Nos. 3,265,756; 3,562,356; 3,700,633; 4,116,917; and 4,156,673, the substance of which is incorporated herein by reference. There are at least two basic classes of these polymers. In one class, the midblock is an unsaturated rubber. Examples of two types of polymers in this class are known to those skilled in the art as SBS and SIS block copolymers. In the other class, the midblock is a saturated olefin rubber. Examples of two types of polymers in this class are known to those skilled in the art as SEBS and SEPS block copolymers. SIS, SBS, SEBS, and SEPS block copolymers are useful in the present invention, with SIS block copolymers being preferred becaus[0085] of the elastomeric properties exhibited by these polymers.

Other useful elastomeric: compositions may include elastomeric polyurethanes, ethylene copolymers such as ethylene vinyl acetates, ethylene/propylene copolymer elastomers or ethylene/propylene/diene terpolymer elastomers. Blends of these elastomers with each other or with modifying non-elastomers may also be useful. For example, up to 50 weight percent, but preferably less than 30 weight percent, of polymers may be added such as poly(alpha-methyl)styrene, polyesters, epoxies, polyolefins, e.g., polyethylene or certain ethylene/vinyl acetates, preferably those of higher molecular weight, or coumarone-indene resin. The ability to use these types of elastomers and blends provides the material with significant flexibility.

In the prestinvention, an oil resistance agent may be added to the core in order to impart oil resistance to the elastomer. In a preferred embodiment, poly(phenylene oxide) is added to the core layer or region. Poly(phenylene oxide) and the styrene groups in the block copolymers may be soluble in each other. Furthermore, the poly(phenylene oxide) may complex with the styrene groups. It is believed that this interaction promotes greater oil resistance.

The concentration of the poly(phenylene oxide) in the core material may be varied to impart more or less resistance. In a preferred embodiment, a range of 1% to 5% concentration of poly(phenylene oxide) by weight percent is preferred with a concentration of about 3% being most preferred.

Additional oil resistance additives, such as PETG, may be added to the core to promote oil resistance. PPE (poly(phenylene ether)) may also be suitable in for use as an oil resistance additive. The concentration of poly(phenylene oxide) may be decreased with the addition of the oil resistance additives such as PETG and PPE, without a drop-off in oil resistance. For example, the poly(phenylene oxide) concentration may be decreased to about 1% when PETG is added in a concentration of about 5% to about 10%. This composition has oil resistance substantially equivalent to a laminate or composite having about 5% concentration of poly(phenylene oxide).

The first polymer of the skin layer may be any semi-crystalline or amorphous polymer that is thermoplastic, extrudable, less elastic than the core layer(s), and will undergo permanent deformation at the stretch percentage that the elastomeric laminate will undergo. Therefore, polyolefins, such as polyethylene, polypropylene, polybutylene, and polyethylene-polypropylene copolymers are suitable. In addition, polyamides, such as nylon, polyesters, such as polyethylene terephthalate, polyvinylidene fluoride, polyacrylates, such as poly(methyl methacrylate) and the like or blends thereof or blends with the polyolefins may be suitable for use.

Figure 4:
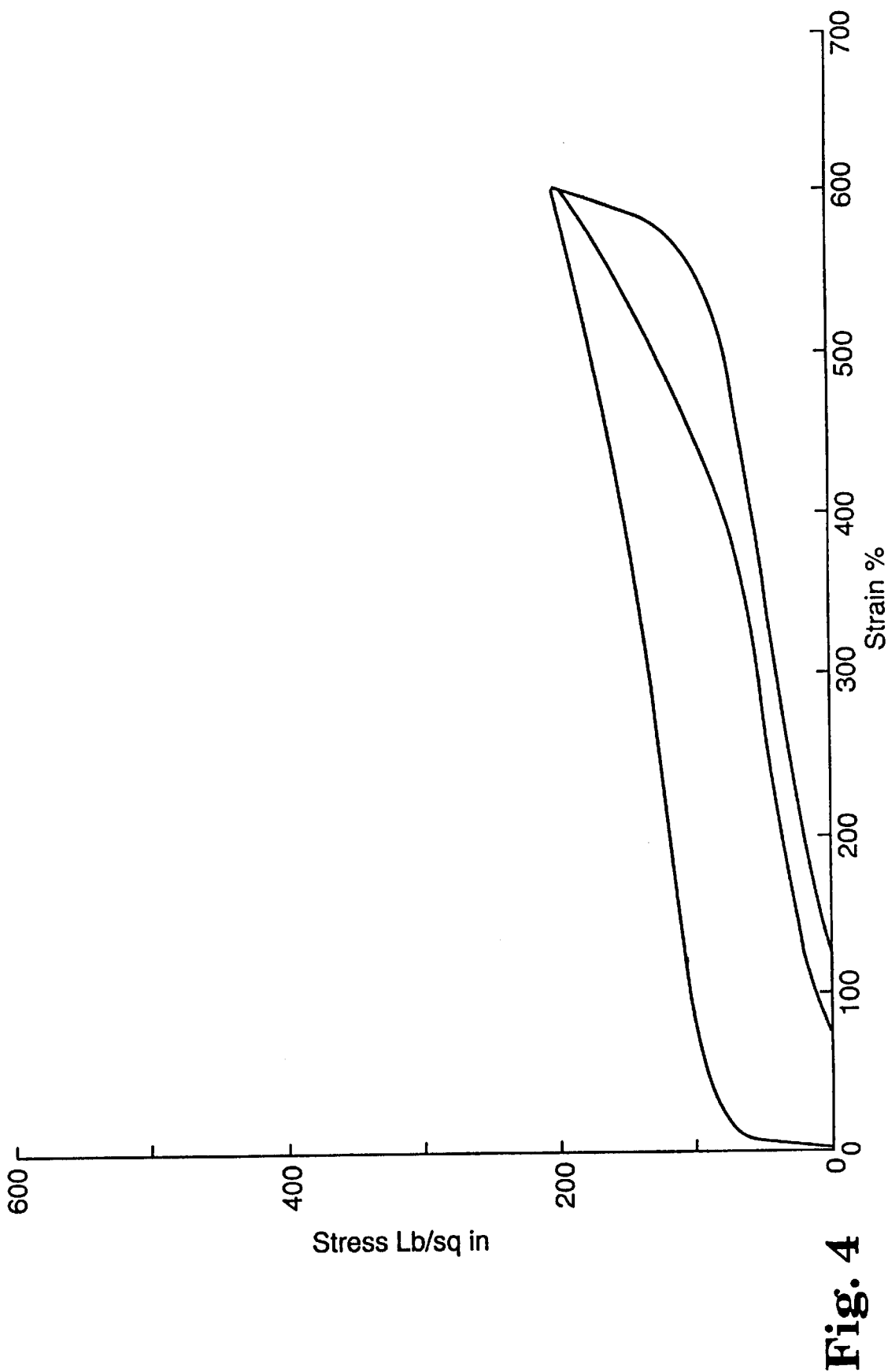
FIG. 4 is a stress/strain curve for a laminate of the present invention.
Figure 5:
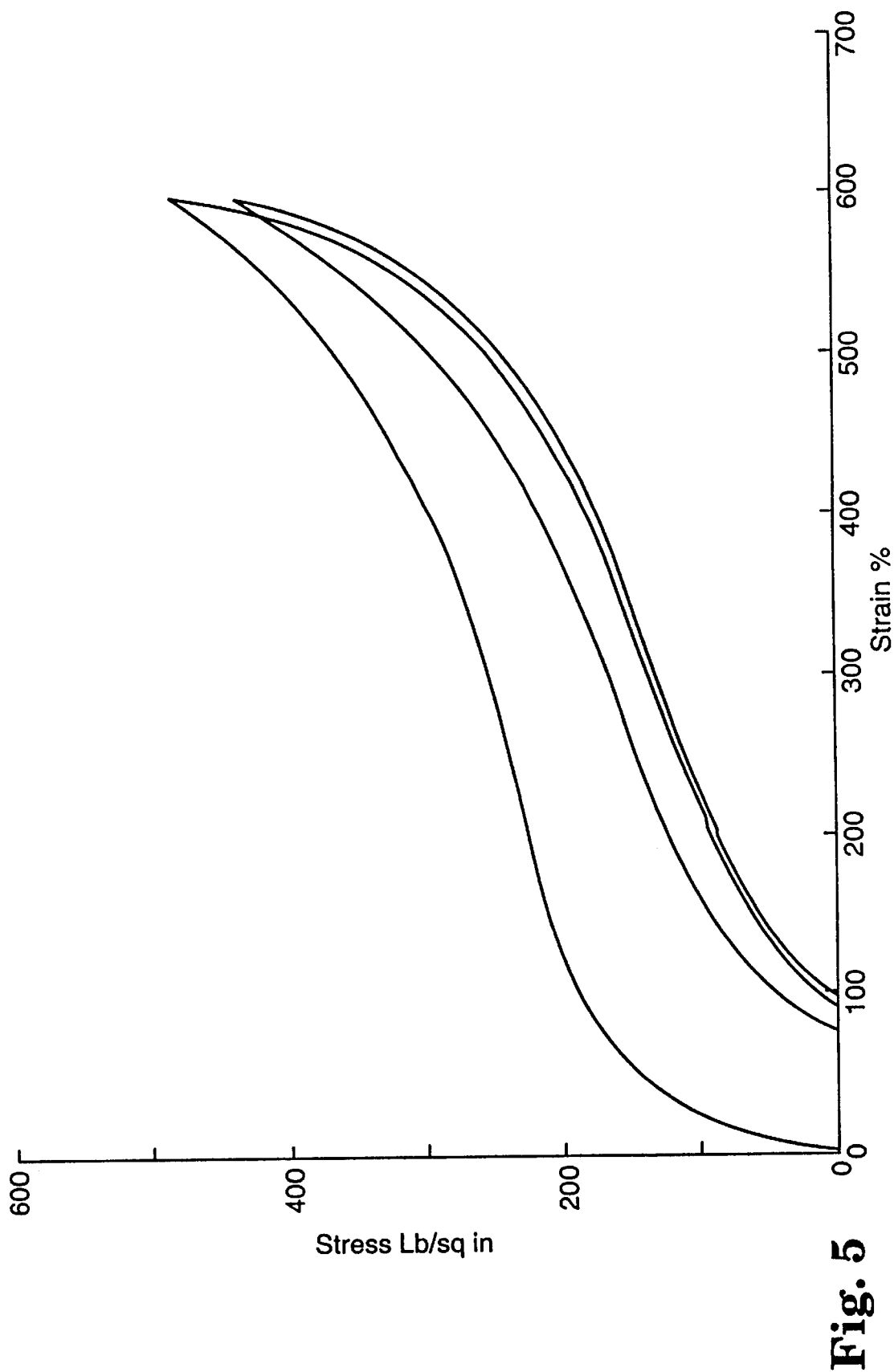
FIG. 5 is a stress/strain curve for a laminate of the present invention.

The second polymeric material of the skin layer may be either a block copolymer or a pressure sensitive adhesive. In the present invention, SBS, SIS, SEBS and SEPS block copolymers are useful. The preferred block copolymers are those that exhibit a relatively long and flat stress/strain curve because they exhibit similar tension over a large range of elongation. Accordingly, SIS block copolymers are preferred because of their stress/strain characteristics. For purposes of illustration, FIGS. 4 and 5 are stress/strain curves for different laminates of the present invention. FIG. 4 is a stress/strain curve for a laminate of the present invention wherein the skin layer contains an SIS block copolymer and the ratio of skin to core to skin is 1:55:1. The graph plots the stress during elongation up to 600% and subsequent relaxation. The graph plots two cycles of elongation and relaxation for the material. FIG. 5 is a stress/strain curve for a laminate of the present invention wherein the skin layer contains SEBS block copolymer and the ratio of skin to core to skin is 1:55:1. As with the graph of FIG. 4, this graph plots stress during elongation up to 600% through two cycles of elongation and relaxation. While both exhibit suitable stress strain characteristics, the SIS block copolymer is preferred because of its flatter stress/strain curve. An example of a preferred SIS block copolymer is the "VECTOR" brand 100% tri-block copolymer manufactured by Dexco Corporation of Houston, Tex. "KRATON" copolymers are also preferred due to their performance at a relatively low cost.

Pressure sensitive adhesives are also suitable for use in the present invention. Suitable pressure sensitive adhesives include block copolymer pressure sensitive adhesives, with SIS block copolymer pressure sensitive adhesives being most preferred due to their stress/strain characteristics. Natural rubber, polyacrylates, butyl rubber and polyisobutylene, sytrene-butadiene rubber random polymers, and the like may also be suitable in the present invention. Typically, a pressure sensitive adhesive comprises an elastomer with a tackifier. However, certain block copolymers may act as pressure sensitive adhesives without the need for the addition of tackifiers.

Block copolymers are preferred over pressure sensitive adhesives because block copolymers do not contain tackifiers. Tackifiers may disrupt the extrusion process and may exhibit other undesired characteristics, such as smell.

The ratio of core to skin in the present invention may be varied. A range of 20:1 to 60:1 is preferred with a ratios of 25:1 and 55:1 being most preferred because of the performance of the material at these ratios. By changing the ratios of core to skin, both the thickness of the core and skin, as well as their elastic properties, may be varied.

A preferred embodiment of the present invention is a laminate that has an SIS "KRATON" copolymer core with a skin layer having a combination of polypropylene and an SIS "KRATON" copolymer, a skin to core to skin ratio of 1:25:1, and an overall thickness of 11.5 mils. The embodiment exhibits a friction force (as defined below) equal to or greater than 0.15 lbs., with a friction force of between 0.15 lbs. and 0.45 lbs. being most preferred. In a headband, a friction force below 0.15 lbs. may be too slippery for certain applications. A friction force above 0.45 lbs. may result in discomfort to a wearer.

The laminates of the present invention are suited for use in headbands. The polymeric core provides elasticity while the skin provides a smooth and soft surface with non-slip characteristics. Accordingly, the headbands may be used in a wide variety of applications where the above described characteristics are desirable, including headbands for respiratory devices such as respirators, filter masks, surgical masks, clean room masks, face shields, dust masks, and a variety of other face coverings.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

EXAMPLES

Sample Preparation

Elastomeric laminates were prepared by coextruding a sheet of elastomeric core material together with two skin layers, one on either side of the core layer, as described in U.S. Pat. No. 5,501,679. In the following Examples, the ratio of the thickness of the first skin layer to the core layer to the second skin layer was about 1:55:1. The total thickness of the elastic laminate was about 0.29 mm (11.5 mils).

The elastomeric laminates were activated as described in U.S. Pat. No. 5,501,679 using the following procedure. A sample of the laminated sheet was cut about 30 cm. (12 in.) wide (cross web direction) and 46 cm. (18 in.) long (down web direction). The ends were rolled around small diameter rods (about 1.3 cm. or 0.5 in. in diameter). The sample was stretched in the machine direction to approximately 600% elongation by pulling the rods in opposite directions, it was held at this elongation for approximately two seconds, and it was allowed to relax.

Oil Test

A 1.3 cm length was marked on sample bands that were subsequently activated to 500% elongation. The bands were permitted to relax for three to five minutes. Subsequently, the bands were elongated to 170% and clamped to a frame having a heating pad that had been heated to 52° C. The heating pad was placed over a curved support to simulate the back of a wearer's head. The marked area was completely covered in olive oil (approximately 3 to 4 drops). After application of the oil, a fifteen minute time period was timed on a stopwatch. The band was observed during the 15 minute period, with the observer noting any discernible physical changes. Thereafter, the band was removed from the frame, the oil was wiped off and the band was permitted to relax for five minutes. The marked area was measured. The band was elongated to its elastic limit and the marked area was measured again. The percentage retained elasticity was determined using the following formula: $(a-b)/b \times 100$ wherein "a" equals the length of the marked area measured at the elastic limit and "b" equals the length of the marked area measured after the 15 minute period. The band was considered to fail the Oil Test if the band broke during the 15 minute period or if the percent elongation fell below 170%.

Friction Test

Test specimens were cut from the activated elastomeric laminate. The width (cross web direction) was about 30 cm. (12 in.) and the length (down web direction) was about 10 cm. (4 in.). The test specimen was laid on a flat bed on an Instron machine and one end was attached to the Instron bed with tape. The Instron machine used in the friction testing was an Instron Model 1122, with a Series 8 Computer Test System attached, available from the Instron Co., 100 Royal Street, Canton, Mass. 02021. A 5.08 cm. (2 in.) length of the test specimen was marked in the center portion of the test specimen, and the untaped end was pulled until the marked 5.08 cm. portion was stretched to 100% elongation (10.16 cm., 4 in.) and fixed by taping the end to the Instron bed. In addition, the free end where the block is initially placed was also taped to the bed.

The force required to slide a test surface across this test specimen of elastomeric laminate was determined as described in ASTM Designation, D 1894- 95, "Standard Test Method for Static and Kinetic Coefficients of Friction of Plastic Film and Sheeting". The slidable test surface was a sled as described in ASTM Designation: D 1894- 95 weighing 200 grams made of a metal block wrapped with a sponge rubber foam having a test surface attached to the sponge rubber foam with double faced tape. The test surface attached to the sled was fake fur to simulate the frictional forces against hair. The fake fur used for testing was "Fake Fur, Fausse Fourrure", Style 1872, composition polyester, manufactured by Western Trimming Corp., Chatsworth Calif. The Instron pulled this sled across the width of the elastomeric laminate specimen (in the cross web direction) with the artificial fur in contact with the elastomeric laminate specimen at a rate of 25.4 cm./min. (10 in./min.). After reaching a steady state, the force was recorded.

Example 1 and Comparative Examples C1–C3

In these examples elastomeric laminates were prepared with a core layer made of Kraton 1107 (available from Shell Chemical Co.). Skin layers were made of a blend of polypropylene PP7C50 (available from Union Carbide Co.) and a pressure sensitive adhesive (PSA), HL-2542-X, (available from H. B. Fuller Co., St. Paul Minn.). The steady state frictional force between this elastomeric laminate and artificial fur as described above is given in Table 1. The frictional force determinations were made in triplicate, with the determinations and averages reported below.

TABLE 1

Frictional Force as a Function of % PSA

| Example | % PSA | Force (N) | Force (Lb) |
|---|---|---|---|
| C1-a | 2 | 0.53 | 0.12 |
| C1-b | 2 | 0.44 | 0.10 |
| C1-c | 2 | 0.44 | 0.10 |
| C1-average | 2 | 0.49 | 0.11 |
| C2-a | 9 | 0.58 | 0.13 |
| C2-b | 9 | 0.53 | 0.12 |
| C2-c | 9 | 0.53 | 0.12 |
| C2-average | 9 | 0.53 | 0.12 |
| C3-a | 20 | 0.80 | 0.18 |
| C3-b | 20 | 0.76 | 0.17 |
| C3-c | 20 | 0.71 | 0.16 |
| C3-average | 20 | 0.76 | 0.17 |
| 1-a | 33 | 0.0.93 | 0.21 |
| 1-b | 33 | 0.89 | 0.20 |
| 1-c | 33 | 0.89 | 0.20 |
| 1-average | 33 | 0.89 | 0.20 |

Examples 2–5 and Comparative Examples C4–C5

In these examples the core layer was made of Kraton 1106 (available from Shell Chemical Co.). The skin layers were made of a blend of polypropylene PP7C12N (available from Shell Chemical Co.) and HL-2542-X. The steady state frictional force between this elastomeric laminate and artificial fair as described above is given in Table 2. The frictional force determinations were made in triplicate, with the determinations and averages reported below.

TABLE 2

Frictional Force as a Function of % PSA

| Example | % PSA | Force (N) | Force (Lb) |
|---|---|---|---|
| C4-a | 0 | 0.62 | 0.14 |
| C4-b | 0 | 0.58 | 0.13 |
| C4-c | 0 | 0.58 | 0.13 |
| C4-average | 0 | 0.58 | 0.13 |
| C5-a | 30 | 0.85 | 0.19 |
| C5-b | 30 | 0.85 | 0.19 |
| C5-c | 30 | 0.80 | 0.18 |
| C5-average | 30 | 0.85 | 0.19 |
| 2-a | 40 | 1.11 | 0.25 |
| 2-b | 40 | 1.07 | 0.24 |
| 2-c | 40 | 1.07 | 0.24 |
| 2-average | 40 | 1.07 | 0.24 |
| 3-a | 45 | 1.29 | 0.29 |
| 3-b | 45 | 1.38 | 0.31 |
| 3-c | 45 | 1.42 | 0.32 |
| 3-average | 45 | 1.38 | 0.31 |

TABLE 2-continued

Frictional Force as a Function of % PSA

| Example | % PSA | Force (N) | Force (Lb) |
|---|---|---|---|
| 4-a | 50 | 1.25 | 0.28 |
| 4-b | 50 | 1.33 | 0.30 |
| 4-c | 50 | 1.38 | 0.31 |
| 4-average | 50 | 1.33 | 0.30 |
| 5-a | 55 | 1.60 | 0.36 |
| 5-b | 55 | 1.78 | 0.40 |
| 5-c | 55 | 1.78 | 0.40 |
| 5-average | 55 | 1.73 | 0.39 |

Examples 6–8 and Comparative Example C6

In these examples the core layer was made of Kraton 1106. The skin layers were made of a blend of polypropylene PP7C12N and Kraton 1106. The steady state frictional force between this elastomeric laminate and artificial fur as described above is given in Table 3. The frictional force determinations were made in triplicate, with the determinations and the averages reported below.

TABLE 3

Frictional Force as a Function of % Kraton 1106

| Example | % KRATON | Force (N) | Force (Lb) |
|---|---|---|---|
| C6-a | 20 | 0.80 | 0.18 |
| C6-b | 20 | 0.80 | 0.18 |
| C6-c | 20 | 0.80 | 0.18 |
| C6-average | 20 | 0.80 | 0.18 |
| 6-a | 30 | 0.93 | 0.21 |
| 6-b | 30 | 0.89 | 0.20 |
| 6-c | 30 | 0.89 | 0.20 |
| 6-average | 30 | 0.89 | 0.20 |
| 7-a | 40 | 1.51 | 0.34 |
| 7-b | 40 | 1.47 | 0.33 |
| 7-c | 40 | 1.51 | 0.34 |
| 7-average | 40 | 1.51 | 0.34 |
| 8-a | 50 | 2.54 | 0.57 |
| 8-b | 50 | 2.89 | 0.65 |
| 8-c | 50 | 2.98 | 0.67 |
| 8-average | 50 | 2.80 | 0.63 |

A duplicate of Example 7 was prepared and tested, and the following results were recorded.

| Example | % KRATON | Force (N) | Force (Lb) |
|---|---|---|---|
| 7-a | 40 | 1.38 | 0.31 |
| 7-b | 40 | 1.47 | 0.33 |
| 7-c | 40 | 1.51 | 0.34 |
| 7-average | 40 | 1.47 | 0.33 |

Examples 9–10

In these examples the core layer was made of Kraton 1657 (available from Shell Chemical Co.). The skin layers were made of a blend of polypropylene PP7C12N and Kraton 1657. The steady state frictional force between this elastomeric laminate and artificial fur as described above is given in Table 4. The frictional force determinations were made in triplicate, with the determinations and the averages reported below.

TABLE 4

Frictional Force as a Function of % Kraton 1657

| Example | % KRATON | Force (N) | Force (Lb) |
|---|---|---|---|
| 9-a | 30 | 1.02 | 0.23 |
| 9-b | 30 | 1.07 | 0.24 |
| 9-c | 30 | 1.07 | 0.24 |
| 9-average | 30 | 1.07 | 0.24 |
| 10-a | 40 | 1.51 | 0.34 |
| 10-b | 40 | 1.56 | 0.35 |
| 10-c | 40 | 1.60 | 0.36 |
| 10-average | 40 | 1.56 | 0.35 |

Examples 11–12

In these examples the core layer was made of Kraton 1106. The skin layers were made of a blend of polypropylene PP7C12N and Kraton 1657. The steady state frictional force between this elastomeric laminate and artificial fur as described above is given in Table 5. The frictional force determinations were made in triplicate, with the determinations and averages reported below.

TABLE 5

Frictional Force as a Function of % Kraton 1657

| Example | % KRATON | Force (N) | Force (Lb) |
|---|---|---|---|
| 11-a | 40 | 1.38 | 0.31 |
| 11-b | 40 | 1.33 | 0.31 |
| 11-c | 40 | 1.42 | 0.32 |
| 11-average | 40 | 1.38 | 0.31 |
| 12-a | 50 | 1.47 | 0.33 |
| 12-b | 50 | 1.56 | 0.35 |
| 12-c | 50 | 1.56 | 0.35 |
| 12-average | 50 | 1.51 | 0.34 |

Example 13

In this example the core layer was made of Vector 4111 (available from Dexco Co., Houston Tex.). The skin layers were made of a blend of polypropylene PP7C12N and HL-2542-X. The steady state frictional force between this elastomeric laminate and artificial fur as described above is given in Table 6. The frictional force determinations were made in triplicate, with the determinations and averages reported below.

TABLE 6

Frictional Force as a Function of % PSA

| Example | % PSA | Force (N) | Force (Lb) |
|---|---|---|---|
| 13-a | 40 | 1.20 | 0.27 |
| 13-b | 40 | 1.16 | 0.26 |
| 13-c | 40 | 1.20 | 0.27 |
| 13-average | 40 | 1.20 | 0.27 |

Example 14

To test oil resistance, two sample batches of three bands each were prepared. The first sample contained Kraton D1106 in the core layer as set forth above. The second batch contained Kraton D1106 as set forth above with PPO 612 poly(phenylene oxide) (available from G.E. Plastics, Pittsfield, Mass.) added to the core at a loading of 5% by weight. The sample bands were oil tested and observed for 15 minutes. After the fifteen minute period, the sample bands were tested for elasticity. The results are reported below ("n" equals the number of bands).

TABLE 7

Oil Resistance

| Oil Test | Retained Elasticity after 15 minutes | n |
|---|---|---|
| Kraton D1106 without PPO 612 | | |
| <3 minutes | 0 | 3 |
| Kraton D1106 with 5% PPO 612 | | |
| >>15 minutes | ≧300% | 3 |

This invention may take on various modifications and alterations without departing from the spirit and scope thereof Accordingly, it is to be understood that this invention is not to be limited to the above-described, but it is to be controlled by the limitations set forth in the following claims and any equivalents thereof It is also to be understood that this invention may be suitably practiced in the absence of any element not specifically disclosed herein.

What is claimed is:

1. An oil resistant material comprising (a) at least one discrete elastomeric core material having at least one styrenic block copolymer and an oil resistance agent and (b) at least one skin layer comprising a blend of a polymer which is thermoplastic, extrudable, and permanently deformed when stretched, and a compound selected from the group consisting of styrenic block copolymers and pressure sensitive adhesives, wherein the material has a first modulus in an unactivated state and a second, lower modulus in an activated state, the skin layer forming a microtextured surface in said activated state.

2. An oil resistant headband having a material with (a) at least one elastomeric core material having at least one styrenic block copolymer and an oil resistance agent and (b) at least one skin layer comprising a blend of a polymer which is thermoplastic, extrudable, and permanently deformed when stretched, and a compound selected from the group consisting of styrenic block copolymers and pressure sensitive adhesives, wherein the material has a first modulus in an unactivated state and a second, lower modulus in an activated state, the skin layer forming a microtextured surface in said activated state.

* * * * *

UNITED STATES PATENT AND TRADEMARK OFFICE
CERTIFICATE OF CORRECTION

PATENT NO. : 6,436,529 B1  Page 1 of 1
DATED : August 20, 2002
INVENTOR(S) : Deeb, Gerald S.

It is certified that error appears in the above-identified patent and that said Letters Patent is hereby corrected as shown below:

<u>Title page, Item [54] and Column1, line 1,</u>
Delete the word "ELATOMERIC" and insert in place thereof -- ELASTOMERIC --.

<u>Column 3,</u>
Line 63, delete the colon after the word "elastomeric".

<u>Column 4,</u>
Line 9, delete the word "prestinvention" and insert in place thereof -- present invention --.

<u>Column 10,</u>
Line 20, delete "$\geqq 300\%$" and insert in place thereof -- $\geq 300\%$ --.

Signed and Sealed this

Eleventh Day of February, 2003

JAMES E. ROGAN
*Director of the United States Patent and Trademark Office*